Patented Apr. 18, 1950

2,504,295

UNITED STATES PATENT OFFICE 2,504,295

CURING COPOLYMERS OF BUTADIENE-1,3 AND ACRYLONITRILE WITH ORGANIC HALOGEN COMPOUNDS

David J. Beaver, St. Albans, W. Va., assignor to Monsanto Chemical Company, St. Louis, Mo., a corporation of Delaware No Drawing. Application August 4, 1944, Serial No. 548,138

3 Claims. (Cl. 260—83.3)

The present invention relates to a process for vulcanizing synthetic rubber-like masses from polymerizable butadiene compounds and polymerizable nitriles and to the vulcanized products so obtained.

While the emulsion copolymers of butadiene-1,3 compounds and polymerizable nitriles are amenable to ordinary sulfur vulcanization just as is natural rubber, some undesirable properties exhibited by the vulcanizates have been attributed to the presence of the sulfur. The need for other methods of vulcanizing rubber whether natural or synthetic has long been recognized but progress has been slow. Rubbery copolymers of butadiene-1,3 and polymerizable nitriles have been admixed with other polymers and resinous materials to achieve various improvements but little has been known regarding other methods of vulcanization.

In accordance with the present invention it has been discovered that copolymers of butadiene-1,3 compounds and organic nitriles may be vulcanized by heating without sulfur in the presence of a monomeric non-resinous halogen compound. Suitable halogens are those of atomic weight at least 35. Both aromatic and aliphatic halides have been observed to possess vulcanizing activity but the aliphatic halides are very much more active. In general, any monomeric non-resinous halogen compound having halogen of atomic weight at least 35 linked to a carbon atom which is a member of an aliphatic chain will vulcanize a butadiene-1,3-nitrile copolymer. While elemental iodine and iodides are satisfactory vulcanizing agents, chlorides are of course much cheaper to use.

The halogen bearing vulcanizing agents are employed in much the same manner as sulfur both as regards amounts and temperature of vulcanization. However, for optimum results somewhat larger quantities are required of certain compounds. Suitable organic halogen compounds investigated comprise halogenated hydrocarbons, ketones, ethers, esters, nitriles, amides, phenols, acid chlorides and anhydrides as well as more complex molecules. Conventional accelerators and pigments like carbon black and zinc oxide may be employed in the stocks but none of these is essential for vulcanization.

The examples set forth below illustrate in detail the practice of the invention. It is to be understood, however, that these are illustrative of the invention and in nowise limitative thereof.

Synthetic rubber stocks were compounded comprising

| Stock | A | B | C | D |
|---|---|---|---|---|
| | Parts by weight | Parts by weight | Parts by weight | Parts by weight |
| Hycar OR [1] | 100 | 100 | 100 | 100 |
| Carbon black | 50 | 50 | 50 | 50 |
| Zinc oxide | 3 | 3 | 3 | 3 |
| Mercaptobenzothiazole | 1.5 | 1.5 | 1.5 | 1.5 |
| Hexachlor dodecyl benzene | 2 | | | |
| Tetra chlor kerosene | | 5.0 | | |
| Chlor naphthalene (30% chlorine) | | | 3.0 | |
| Chlor naphthalene (50% chlorine) | | | | 5.0 |

[1] Copolymer of butadiene-1,3 and acrylonitrile.

The stocks so compounded were vulcanized by heating in a press at 142° C. for different periods of time. The modulus and tensile properties of the resulting products are set forth below:

Table I

| Stock | Cure Time in Mins. | Modulus of Elasticity at 300% elongation in lbs./in.² | Tensile at Break in lbs./in.² | Ult. Elong., Percent |
|---|---|---|---|---|
| A | 30 | 960 | 1,860 | 570 |
| B | 30 | 820 | 2,210 | 685 |
| C | 30 | 550 | 1,310 | 735 |
| D | 30 | 470 | 1,350 | 835 |
| A | 60 | 1,430 | 3,800 | 535 |
| B | 60 | 1,280 | 3,560 | 610 |
| C | 60 | 741 | 1,970 | 700 |
| D | 60 | 660 | 2,170 | 735 |

A base stock was compounded as follows:

| | Parts by weight |
|---|---|
| Hycar OR | 100 |
| Carbon black | 50 |
| Zinc oxide | 3 |
| Mercaptobenzothiazole | 1 |

Stocks were compounded containing in addition to the above ingredients the compounds shown below:

| Stock: | | Parts by weight |
|---|---|---|
| E | Dichlor kerosene | 2 |
| F | Monochlor kerosene | 2 |
| G | Decyl chloride | 2 |
| H | Hexachlor diethyl benzene | 2 |
| J | Monochlor diethyl benzene | 2 |
| K | Chlorinated Diesel oil (11% chlorine) | 2 |
| L | Chlorinated triethyl benzene (33% chlorine) | 2 |
| M | α,α,β trichlor propionitrile | 2 |
| N | Chloracetamide | 5 |

The stocks so compounded were cured by heating in a press for 60 minutes at 142° C. The modulus and tensile properties of the cured products are shown below.

Table II

| Stock | Modulus of Elasticity in lbs./in.² at elongation of 300% | Tensile at Break in lbs./in.² | Ult. Elong., percent |
|---|---|---|---|
| E | 680 | 1,870 | 760 |
| F | 600 | 1,760 | 795 |
| G | 600 | 1,405 | 590 |
| H | 1,100 | 2,915 | 630 |
| I | 770 | 2,045 | 700 |
| J | 660 | 1,819 | 740 |
| K | 825 | 2,260 | 660 |
| L | 1,250 | 3,260 | 600 |
| M | 555 | 1,690 | 830 |

Frequently the accelerator can be omitted altogether without materially affecting the physical properties as illustrated below. Stocks were compounded comprising

| Stock | P | Q |
|---|---|---|
| | Parts by weight | Parts by weight |
| Hycar OR | 100 | 100 |
| Carbon black | 50 | 50 |
| Zinc oxide | 3 | 3 |
| Hexachlor dodecyl benzene | 5 | |
| Tetra chlor kerosene | | 2 |

The stocks so compounded were cured in a press by heating for different periods of time at 142° C.

Table III

| Stock | Cure Time in Mins. | Modulus of Elasticity in lbs./in.² at Elongation of 300% | Tensile at Break in lbs./in.² | Ult. Elong., Per Cent |
|---|---|---|---|---|
| P | 30 | 1,360 | 2,465 | 580 |
| Q | 30 | 895 | 1,555 | 500 |
| P | 60 | 2,039 | 3,400 | 480 |
| Q | 60 | 1,200 | 2,140 | 500 |

As illustrative of vulcanization in the absence of both accelerator and zinc oxide, stocks were compounded comprising

| Stock | R | S | T | U | V | W |
|---|---|---|---|---|---|---|
| | Parts by weight | Parts by weight | Parts by weight | Parts by weight | Parts by weight | Parts by weight |
| Hycar OR | 100 | 100 | 100 | 100 | 100 | 100 |
| Carbon black | 50 | 50 | 50 | 50 | 50 | 50 |
| α,β,β' trichlor ethyl benzene | 5 | | | | | |
| Styrene chlorhydrin | | 5 | | | | |
| α,β, dichlor ethyl benzene | | | 5 | | | |
| β,β dichlor styrene | | | | 5 | | |
| β chlor styrene | | | | | 5 | |
| Naphthalene β sulfonyl chloride | | | | | | 5 |

The stocks so compounded were vulcanized by heating in a press for 60 minutes at 142° C. The physical properties of the vulcanizates are set forth below.

Table IV

| Stock | Modulus of Elasticity in lbs./in.² at elongation of 300% | Tensile at Break in lbs./in.² | Ult. Elong., percent |
|---|---|---|---|
| R | 955 | 1,760 | 490 |
| S | 735 | 1,480 | 530 |
| T | 810 | 1,605 | 560 |
| U | 680 | 1,395 | 565 |
| V | 610 | 1,285 | 590 |
| W | 585 | 1,110 | 460 |

The vulcanizates of the present invention are in general characterized by excellent resistance to deterioration upon aging in air or oxygen. Not only is the original tensile strength largely retained after aging but a substantial proportion of the original elongation as well. Thus, as further illustrative of the invention stocks were compounded comprising

| Stock | X | Y |
|---|---|---|
| | Parts by weight | Parts by weight |
| Hycar OR | 100 | 100 |
| Carbon black | 50 | 50 |
| Stearic Acid | 1 | 1 |
| Phenyl β naphthylamine | 1 | 1 |
| 2,2' Dithio bis benzothiazole | 1.5 | |
| Magnesium oxide | 3.3 | 3.3 |
| Zinc oxide | 8.8 | 8.8 |
| Benzyl chloride | 10.0 | |
| Benzotrichloride | | 10.0 |
| N-cyclohexyl-2-benzothiazole sulfenamide | | 1.5 |

The stocks so compounded were vulcanized by heating in a press at 148° C. and the vulcanized products artificially aged by heating in a circulating air oven for 24 hours at 100° C. The physical properties both before and after aging are set forth below.

Table V

| Stock | Cure Time in Mins. | Aging | Modulus of Elasticity in lbs./in.² at elongation of 300% | Tensile at Break in lbs./in.² | Ult. Elong., Per Cent |
|---|---|---|---|---|---|
| X | 60 | unaged | 665 | 3,000 | 635 |
| X | 60 | aged | 1,320 | 3,310 | 430 |
| Y | 60 | unaged | 2,080 | 4,320 | 415 |
| Y | 60 | aged | 3,060 | 3,960 | 260 |
| X | 90 | unaged | 650 | 2,960 | 690 |
| X | 90 | aged | 1,240 | 3,380 | 500 |
| Y | 90 | unaged | 2,210 | 4,400 | 410 |
| Y | 90 | aged | 3,250 | 4,150 | 270 |

Halogen bearing derivatives of mercaptobenzothiazole may be employed as vulcanizing agents. Thus, vulcanization of the emulsion copolymer of butadiene-1,3 and acrylonitrile has been effected with the reaction product of equimolecular proportions of mercaptobenzothiazole and benzotrichloride, the reaction product of equi-molecular proportions of the potassium salt of mercaptobenzothiazole and glyceryl dichlor hydrin, 2-($\beta,\beta'$ dichlor isopropyl) mercaptobenzothiazole and the product obtained by introducing one atom of chlorine into benzothiazyl thio acetic acid. The chlorine probably replaces one hydrogen of the —$CH_2$— group but this is not known with certainty. Vulcanization with the last mentioned compound is illustrated below. A stock was compounded comprising Stock Z, parts by weight
Hycar OR _____ 100
Carbon black _____ 50
Zinc oxide _____ 3
Mono chlorinated benzothiazyl thio acetic acid _____ 5

The stock so compounded was vulcanized in the usual manner by heating in a press at 142° C. Vulcanized products were obtained having the properties shown below.

Table VI

| Stock | Cure Time in Mins. | Modulus of Elasticity in lbs./in.² at Elongation of 300% | Tensile at Break in lbs./in.² | Ult. Elong., Per Cent |
|---|---|---|---|---|
| Z | 60 | 1,360 | 2,400 | 550 |
| Z | 90 | 1,565 | 2,910 | 550 |

As further illustrative of the invention a stock was compounded comprising

Stock Z-1, parts by weight
Hycar OR _____ 100
Carbon black _____ 50
Zinc oxide _____ 3
N-cyclohexyl-2-benzothiazole sulfenamide_ 1.5
Cetyl bromide _____ 5

The stock so compounded was vulcanized by heating in a press for different periods of time at 300° F. and the vulcanized products artificially aged by heating in an oven for 24 hours at 100° C.

Table VII

| Stock | Cure Time in Mins. | Modulus of Elasticity in lbs./in.² at Elongation of 300% | Tensile at Break in lbs./in.² | Ult. Elong., Per Cent |
|---|---|---|---|---|
| unaged | 60 | 1,610 | 3,130 | 500 |
| aged | 60 | 778 | 2,650 | 710 |
| unaged | 90 | 1,295 | 2,875 | 565 |
| aged | 90 | 885 | 2,795 | 670 |

An outstanding characteristic of vulcanizates of this invention is their ability to withstand very low temperatures without shattering. Particularly outstanding in this respect are vulcanizates obtained by the use of long chain alkyl halides such as chlorinated kerosene for vulcanizing the copolymers. For example, a stock comprising Hycar OR 100, carbon black 50, zinc oxide 3, N-cyclohexyl-2-benzothiazole sulfenamide 1.5 and tetra chlor kerosene 2 (parts by weight) after vulcanization withstood without shattering temperatures substantially as low as those withstood by conventional stocks containing the usual sulfur curatives and 20-30% plasticizer. It is noteworthy that low shatter points could be obtained in the absence of plasticizer since swelling in 100 octane gasoline and extraction of material from the stock by the gasoline were nearly reduced to zero while at the same time retaining the resistance to shattering at low temperatures desired for certain important uses.

Even lower shatter points can be obtained by using alkylated aromatics containing halogen in both the ring and alkyl group. For example, stocks were compounded comprising,

| Stock | A-1 | A-2 | A-3 | A-4 |
|---|---|---|---|---|
| | Parts by weight | Parts by weight | Parts by weight | Parts by weight |
| Hycar OR | 100 | 100 | 100 | 100 |
| Carbon black | 50 | 50 | 50 | 50 |
| Zinc oxide | | 3 | 3 | 3 |
| Litharge | 2.5 | | 3 | |
| Tetramethyl thiuram disulfide | 2.5 | | | |
| Zinc diethyl dithiocarbamate | 2.5 | | | |
| Tributoxy ethyl phosphate | 20.0 | | | |
| N-cyclohexyl-2-benzothiazole sulfenamide | | 1.5 | 1.5 | 1.5 |
| Trichlor benzyl chloride | | 3 | 5 | |
| Trichlor (monochlor ethyl) benzene | | | | 5.0 |

The stocks so compounded were vulcanized in the usual manner by heating in a press at 142° C. The brittle point of the vulcanizates was determined by gradually cooling the stocks in a cold box and determining the temperature at which a dumbbell test piece broke or shattered upon flexure.

Table VIII

| Stock | Cure Time in Mins. | Modulus of Elasticity in lbs./in.² at Elongation of 300 percent | Tensile at Break in lbs./in.² | Ult. Elong., percent | Brittle Point, ° C. |
|---|---|---|---|---|---|
| A-1 | 60 | 920 | 3,520 | 700 | -50 |
| A-2 | 60 | 770 | 2,810 | 695 | -60 |
| A-3 | 60 | 1,115 | 3,530 | 630 | -70 |
| A-4 | 60 | 675 | 2,360 | 820 | -60 |
| A-1 | 90 | 950 | 3,190 | 690 | -50 |
| A-2 | 90 | 1,200 | 3,130 | 705 | -60 |
| A-3 | 90 | 1,895 | 3,725 | 530 | -70 |
| A-4 | 90 | 1,000 | 3,055 | 700 | -60 |

The excellent resistance to shattering at low temperatures exhibited by the vulcanizates obtained by use of halogen bearing aralkyl compounds as vulcanizing agents are at once apparent from the above results. Likewise, the curative power of these vulcanizing agents is shown to be of a high order.

Examples of other suitable aralkyl vulcanizing agents containing halogen in both the ring and side chain are amyl naphthalenes chlorinated in both the ring and side chain, isopropyl naphthalene chlorinated in both the ring and side chain, p-methyl isopropyl benzene chlorinated in both the ring and side chain, β chlor ethyl 2,4 dichlor benzene and α,β dichlor ethyl 2,4 dichlor benzene, hexachlor decyl trichlor benzene, hexachlor dodecyl trichlor benzene, di(chlor ethyl) dichlor benzene and chlor ethyl ethyl trichlor benzene.

While many specific embodiments of the invention have been described, the invention is by no means limited thereto. Again, other types of halogen compounds may be used with varying results as for example halogen bearing ethers such as dichlor ethyl ether. While acid chlorides, as for example succinyl chloride, adipyl chloride, benzoyl chloride and phthalyl chloride bring about vulcanization, the vulcanizates do not develop high tensile strengths and it is preferred to use other types of halogen compounds. Sulfur vulcanizable copolymers made from other butadiene-1,3 compounds as for example isoprene and dimethyl butadiene with polymerizable nitriles can be used. Likewise, other polymerizable nitriles can be used as for example methacrylonitrile, brom acrylonitrile, α methyl β brom acrylonitrile, ethyl β cyanocrotonate, α phenyl acrylonitrile, α chlor acrylonitrile and the like.

It will be apparent that many variations and modifications are within the spirit and scope of this invention. The present invention is not limited except as defined by the claims attached hereto as part of the present specification.

What is claimed is:

1. The process of curing a sulfur vulcanizable rubbery copolymer obtained by the emulsion copolymerization of butadiene-1,3 and acrylonitrile which comprises heating the copolymer without sulfur in the presence of 2–10 parts on the copolymer of a long chain alkyl chloride consisting solely of carbon, hydrogen, and chlorine atoms, and containing at least 10 but not more than 16 carbon atoms.

2. The process of curing a sulfur vulcanizable rubbery copolymer obtained by the emulsion copolymerization of butadiene-1,3 and acrylonitrile which comprises heating the copolymer without sulfur in the presence of 2–10 parts on the copolymer of a chlorinated kerosene containing at least one atom of chlorine per mol.

3. The cured product comprising the synthetic rubbery emulsion copolymerization product of butadiene-1,3 and acrylonitrile prepared by heating the copolymer without sulfur in the presence of 2 parts on the copolymer of a chlorinated kerosene containing at least one atom of chlorine per mol.

DAVID J. BEAVER.

REFERENCES CITED

The following references are of record in the file of this patent:

UNITED STATES PATENTS

| Number | Name | Date |
|---|---|---|
| 2,235,149 | Gerke | Mar. 18, 1941 |
| 2,340,699 | Sarbach | Feb. 1, 1944 |
| 2,385,290 | Lichty | Sept. 18, 1945 |

OTHER REFERENCES

Van der Meer, Rubber Chem. and Technology 18 (1945), pp. 853–873, reprinted from the Recueil des Travaux Chimiques des Pays-Bas, vol. 63, No. 4, pp. 147–169, Apr. 1944. This investigation is described in detail also in the Thesis of van der Meer, "De Vulcanisatie van Rubber met Phenol-Formaldehyde Derivaten," Delft, Holland, 1943.

Wildschut, Rubber Chem. and Technology 19 (1946), pp. 86–99. This paper was published in the Recueil des Travail Chimiques des Pays-Bas, vol. 61, pp. 898 et seq. (1942).